United States Patent
Sado (10) Patent No.: US 7,102,840 B2
(45) Date of Patent: Sep. 5, 2006

(54) DISC APPARATUS AND SERVO PATTERN WRITE METHOD THEREOF

(75) Inventor: Hideo Sado, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 99 days.

(21) Appl. No.: 10/983,042

(22) Filed: Nov. 8, 2004

(65) Prior Publication Data

US 2006/0098319 A1 May 11, 2006

(30) Foreign Application Priority Data

Feb. 25, 2004 (JP) ............................ 2004-050268

(51) Int. Cl.
*G11B 5/09* (2006.01)
(52) U.S. Cl. ...................................... 360/48
(58) Field of Classification Search ................ 360/48, 360/49, 50, 39, 55, 75, 76, 77.04, 77.08, 360/77.01, 77.05, 78.06
See application file for complete search history.

(56) References Cited

U.S. PATENT DOCUMENTS

| | | | | |
|---|---|---|---|---|
| 5,170,299 A * | 12/1992 | Moon | ..................... | 360/77.08 |
| 5,335,123 A * | 8/1994 | Shimizu et al. | ............ | 360/75 |
| 5,383,068 A * | 1/1995 | Shimizu et al. | .......... | 360/78.06 |
| 5,576,906 A * | 11/1996 | Fisher et al. | ............. | 360/77.08 |
| 5,790,341 A * | 8/1998 | Cunningham et al. | ........ | 360/76 |
| 5,892,634 A * | 4/1999 | Ito et al. | ................... | 360/77.08 |
| 6,005,740 A * | 12/1999 | Liikanen | ................... | 360/77.08 |
| 6,034,835 A * | 3/2000 | Serrano | .................... | 360/77.05 |
| 6,043,952 A * | 3/2000 | Liikanen | ................... | 360/77.08 |
| 6,456,449 B1 * | 9/2002 | Belser et al. | ............. | 360/77.01 |
| 6,760,185 B1 * | 7/2004 | Roth et al. | ............... | 360/77.08 |
| 6,940,677 B1 * | 9/2005 | Fukushima et al. | ........... | 360/75 |
| 6,965,491 B1 * | 11/2005 | Perlmutter et al. | ....... | 360/77.04 |
| 7,012,773 B1 * | 3/2006 | Ashikaga et al. | ............. | 360/48 |
| 7,019,924 B1 * | 3/2006 | McNeil et al. | ................ | 360/48 |
| 7,023,637 B1 * | 4/2006 | Kupferman | .................. | 360/48 |
| 2003/0218821 A1 | 11/2003 | Sado | | |

FOREIGN PATENT DOCUMENTS

| | | |
|---|---|---|
| JP | 10-050014 | 2/1998 |
| JP | 2001-143416 | 5/2001 |
| JP | 2002-288956 | 10/2002 |
| JP | 2002-319253 | 10/2002 |

* cited by examiner

*Primary Examiner*—Fred F. Tzeng
(74) *Attorney, Agent, or Firm*—Pillsbury Winthrop Shaw Pittman LLP

(57) ABSTRACT

Disclosed are a disc apparatus and a servo pattern write method thereof. The disc apparatus includes a disc having: a first servo pattern formed of burst patterns and written to have predetermined repetition patterns in a radial direction; and second servo pattern having a first repetition pattern portion and a second repetition pattern portion that are alternately arranged in the radial direction, the first repetition pattern portion having the same repetition patterns as the repetition patterns of the first servo pattern and written at a position deviated in the radial direction from the first servo pattern by approximately one fourth of the radial direction width of the burst pattern, and the second repetition pattern portion having the same repetition patterns as the repetition patterns of the first servo pattern and written at a position with substantially no deviation in the radial direction from the first servo pattern.

6 Claims, 11 Drawing Sheets

DISC APPARATUS AND SERVO PATTERN WRITE METHOD THEREOF

CROSS-REFERENCE TO RELATED APPLICATIONS

This application is based upon and claims the benefit of priority from the prior Japanese Patent Application No. 2004-50268, filed on Feb. 25, 2004; the entire contents of which are incorporated herein by reference.

BACKGROUND

1. Field of the Invention

The present invention relates to a disc apparatus having a disc with servo information written thereon and a method of writing servo patterns on the disc, and more particularly, to a disc apparatus that itself is capable of writing the servo information (i.e., that has a self-servowrite capability) and a servo pattern write method thereof.

2. Description of the Related Art

Precision improvement in positioning a write head at the time of self-servowrite is indispensable for writing detailed servo information. Conventional arts related to the positioning of a read head necessary for positioning a write head include those described in Japanese Patent Laid-open Application No. Hei. 10-50014 (Patent document 1), Japanese Patent Laid-open Application No. 2002-319253 (Patent document 2), and Japanese Patent Laid-open Application No. 2002-288956 (Patent document 3).

Patent document 1 and Patent document 2 disclose methods of weighted-averaging a plurality of servo bursts (propagation patterns) in order to obtain a position error signal of a read head. Besides, another art of writing an auxiliary burst signal for self-servowrite is disclosed. Patent document 3 discloses that servo information written on a front surface and that written on a rear surface are deviated from each other in a radial direction by an amount equal to one fourth of a track width.

[Patent document 1] Japanese Patent Laid-open Application No. Hei 10-50014 (FIG. 11, paragraphs 0041 to 0043, FIG. 14, paragraph 0044)

[Patent document 2] Japanese Patent Laid-open Application No. 2002-319253

[Patent document 3] Japanese Patent Laid-open Application No. 2002-288956 (FIG. 9, paragraph 0082)

The methods disclosed in Patent documents 1, 2 are thought to have a drawback in view of positioning precision of the read head since it is sometimes unavoidable to detect the position error signal near a dynamic range saturation point of the output thereof at the time of the positioning of the read head. This precision affects positioning precision of the write head. The method of writing the auxiliary burst signal is also thought to have a drawback in view of write efficiency because it requires an increased time and labor. Further, Patent document 3 does not teach in its disclosed contents what measure should be taken to solve the situation that the radial direction interval between the read/write heads changes depending on the radial direction position.

SUMMARY

The present invention was made in view of the above-described circumstances, and an object thereof is to provide a disc apparatus having a disc with servo information written thereon and a method of writing servo patterns on the disc, and more particularly, to a disc apparatus having a self-servowrite capability that realizes improvement in positioning precision of a write head by constantly ensuring positioning precision of a read head and a servo pattern write method thereof.

A disc apparatus according to an aspect of the present invention includes: a disc as a recording medium; a recording element which records information on the disc; and a read element which reads the information recorded on the disc, wherein the disc includes: a first servo pattern formed of burst patterns and written so as to have predetermined repetition patterns in a radial direction; and a second servo pattern having a first repetition pattern portion and a second repetition pattern portion that are alternately arranged in the radial direction, the first repetition pattern portion having same repetition patterns as the repetition patterns of the first servo pattern and written at a position deviated in the radial direction from the first servo pattern by approximately one fourth of a width in the radial direction of the burst pattern, and the second repetition pattern portion having same repetition patterns as the repetition patterns of the first servo pattern and written at a position with substantially no deviation in the radial direction from the first servo pattern.

Therefore, the disc of this disc apparatus has the first servo pattern and the second servo pattern written thereon. The first servo pattern is formed of the burst patterns and has the predetermined repetition patterns in the radial direction. On the other hand, the second servo pattern has the first repetition pattern portion and the second repetition pattern portion which are alternately arranged in the radial direction. The second repetition pattern portion has the same repetition patterns as the repetition patterns of the first servo pattern and is written with substantially no deviation in the radial direction from the first servo pattern. On the other hand, the first repetition pattern portion has the same repetition patterns as the repetition patterns of the first servo pattern, but is positioned with the deviation from the first servo pattern in the radial direction by approximately one fourth of the radial direction width of the burst pattern.

Such two servo patterns prewritten on the disc indicate that, in additional write of the second servo pattern based on the read of the first servo pattern and additional write of the first servo pattern based on the read of the second servo pattern, it was possible to prevent the positioning of "the read element" (read head) based on an output thereof from being performed near a dynamic range saturation point of a position error signal output. Therefore, such two prewritten servo patterns can be considered as a trace indicating that it was possible to improve positioning precision of "the recording element" (write head) corresponding the situation that the radial direction interval between "the read element" and "the recording element" (read/write heads) changes depending on the radial direction position.

Note that the first servo pattern is a genuine servo pattern and the second servo pattern is a so-called dummy pattern for self-servowrite, but it does not cause any problem if the second servo pattern is left unerased. This is because the second servo pattern is neglected or disappears by overwrite in a later operation when a servo operation is performed with the first servo pattern.

A servo pattern write method according to an aspect of the present invention includes: a first step of additionally writing, on an outer side/inner side in a radial direction of a second servo pattern that has been written on a disc, a second servo pattern with a first offset being added to a position of a read head so as to keep a track width constant based on read of a first servo pattern that has been written on the disc, and additionally writing a first servo pattern on an outer side/inner side in the radial direction of the first servo pattern that has been written on the disc, with a second offset being added to the position of the read head so as to keep the track width constant based on read of the additionally written second servo pattern, the additional write of the second servo pattern and the additional write of the first servo pattern being alternately executed; a second step of detecting that the first offset added at the read of the first servo pattern has reached approximately one eighth of the track width; a third step, after the detection, of additionally writing a second servo pattern on an outer side/inner side in the radial direction of the additionally written second servo pattern with a third offset in an opposite direction of the first offset being added to the position of the read head so as to keep the track width constant based on read of the additionally written first servo pattern, and additionally writing a first servo pattern on an outer side/inner side in the radial direction of the additionally written first servo pattern with a fourth offset in an opposite direction of the second offset being added to the position of the read head so as to keep the track width constant based on read of the additionally written second servo pattern, the additional write of the second servo pattern and the additional write of the first servo pattern being alternately executed; and a fourth step of detecting that the third offset added at the read of the first servo pattern has reached approximately one eighth of the track width, wherein the first, second, third, and fourth steps are repeated a plurality of times.

This servo pattern write method is one of the methods used for providing the above-described disc apparatus. Here, in the second and fourth steps, it is detected that the offset of the position of the read head added at the read of the servo pattern has reached approximately one eighth of the track width, and thereafter, the subsequent step continues. With the offset corresponding to approximately one eighth of the track width, it is possible to avoid that the positioning is performed near the dynamic range saturation point of the position error signal output. Therefore, according to this method, positioning precision of the read head is constantly ensured, which can improve positioning precision of the write head. Incidentally, the expression "on an outer side/inner side in the radial direction" is used in order to imply that the additional write for the servo write may progress in an outward direction from the inner side of the disc or may progress in an inward direction from the outer side of the disc.

According to the present invention, in self-servowrite, positioning precision of "the read element" (read head) is constantly ensured, so that it is possible to improve positioning precision of "the recording element" (write head).

DETAILED DESCRIPTION

Explanation of Embodiment

Embodiments of the present invention will be described with reference to the drawings, but these drawings are provided only for an illustrative purpose and by no means are intended to limit the present invention.

As a mode of an embodiment of the disc apparatus of the present invention, a width of each track defined by the burst pattern can be substantially constant, not dependent on a radial direction position thereof on the disc. This is the result of the arrangement of the tracks with the highest compactness.

As another mode, the burst patterns may be four kinds of burst patterns whose positions in a circumferential direction are different. The four kinds of burst patterns whose positions in the circumferential direction are different are often used as a servo pattern of a magnetic disc apparatus.

Further, as a mode of an embodiment of the servo pattern write method of the present invention, the method may further include erasing the second servo patterns after the additional write of all the second servo patterns is completed. This is to erase the servo patterns as dummy patterns.

As another mode, at a start of the third step after the second step and at a start of the first step after the fourth step, the second servo pattern may be additionally written at a position slightly deviated backward from a final write position of the second servo pattern. This is for quick readiness for new write.

Figure 1:
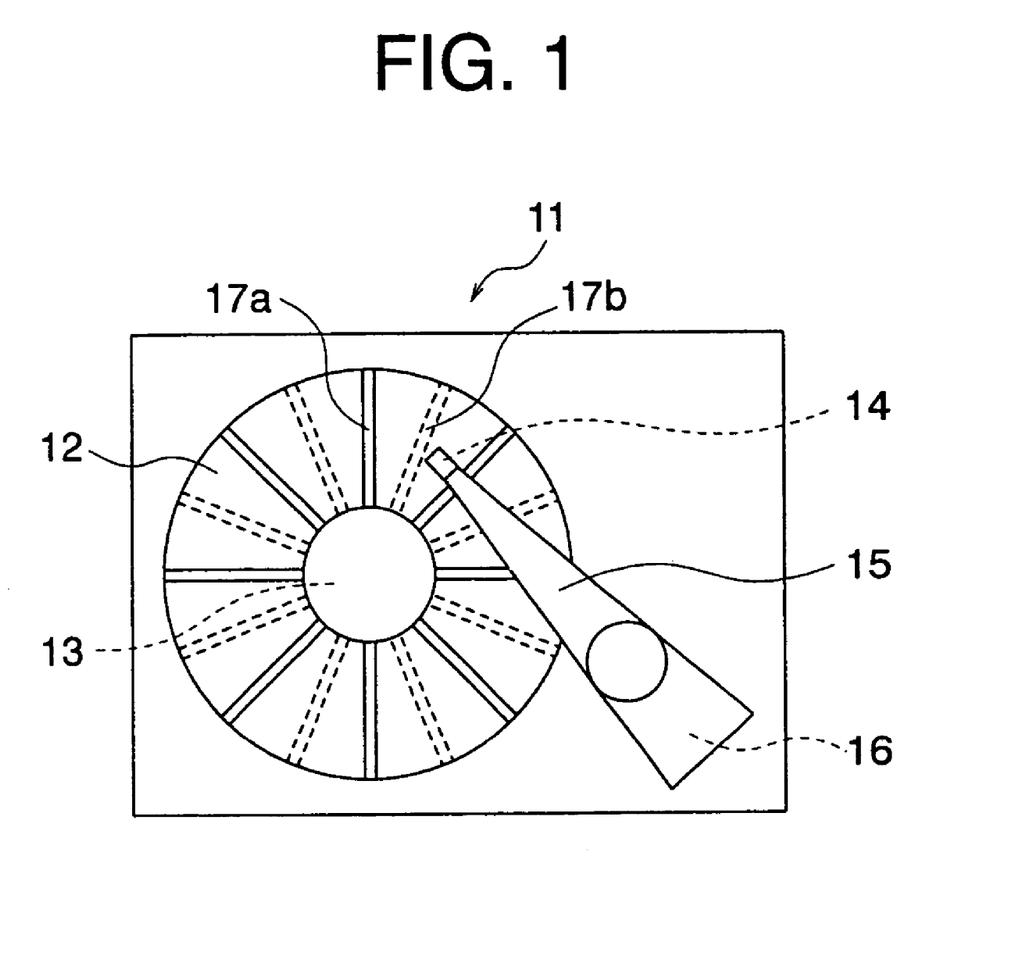
FIG. 1 is a schematic view showing the structure of a magnetic disc apparatus as a disc apparatus according to an embodiment of the present invention.

Based on the above, an embodiment of the present invention will be hereinafter described with reference to the drawings. FIG. 1 is a schematic view showing the structure of a magnetic disc apparatus as a disc apparatus according to the embodiment of the present invention. As shown in FIG. 1, this magnetic disc apparatus 11 includes a magnetic disc 12, a spindle motor 13, a head 14, a carriage 15, and a voice coil motor 16, and further has a processing substrate (not shown) performing electrical signal processing (including servo signal processing). The magnetic disc 12 has, in addition to servo patterns 17a, second servo patterns 17b recorded thereon, the second servo patterns being written as auxiliary servo patterns for self-servowrite. The second servo patterns may be erased after the self-servowrite is completely finished. The description below will begin with general explanation of the self-servowrite and go into the explanation of the structure of the second servo pattern 17b which is a characteristic of this embodiment. Note that the same reference numerals and symbols are used to designate the same and corresponding elements in the following drawings.

First, the relation among the above-described constituent elements will be roughly described. The magnetic disc apparatus 11 has the spindle motor 13, the magnetic disc 12 rotated by the spindle motor 13, the voice coil motor 16, the carriage 15 which can be moved in a radial direction of the magnetic disc 12 by the voice coil motor 16, and the head 14, which is provided at a tip of the carriage 15, for signal read and write. This structure itself is a known one. The self-servowrite is an art of prewriting servo signals (servo patterns 17a), which are to be recorded on the magnetic disc 12 in advance at the time of shipment, utilizing the structure that the magnetic disc apparatus 11 itself has without using a special device. By this art, each magnetic disc apparatus 11 performs servo write, so that production efficiency is improved.

Figure 2A:
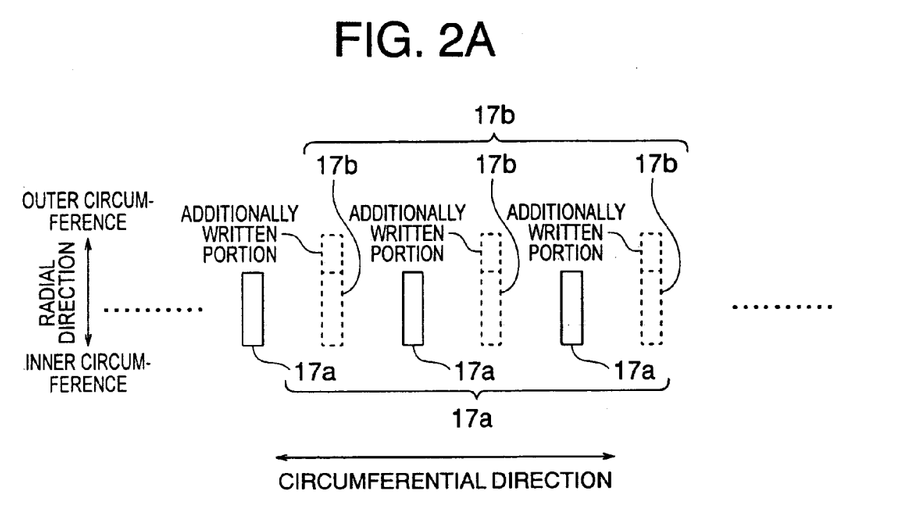
FIG. 2A and FIG. 2B are explanatory views of self-servowrite.
Figure 2B:
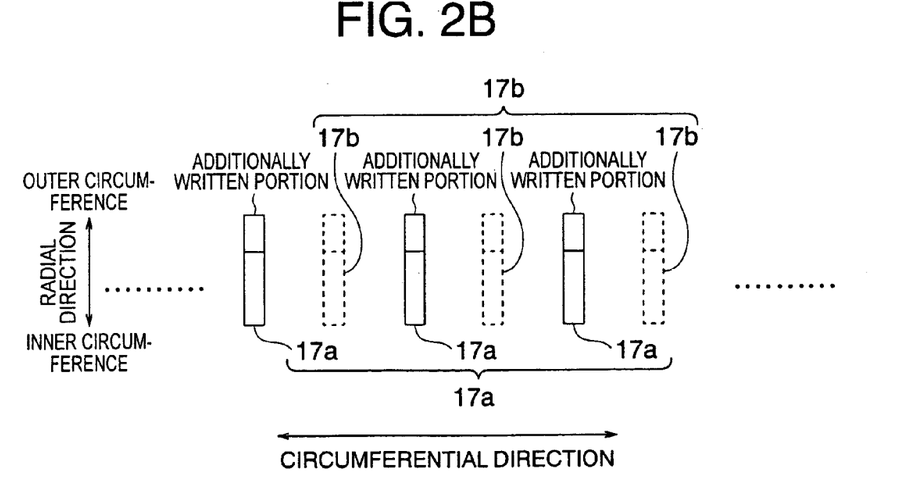

The plural servo patterns 17a are generally recorded radially on the magnetic disc 12 at equal intervals as shown in the drawing. The same number of the second servo patterns 17b are recorded in the middle of respective spaces between the servo patterns 12a, for example as shown in the drawing. Next, FIG. 2A and FIG. 2B are explanatory views of the self-servowrite. The magnetic disc apparatus 11 realizes the self-servowrite by repeating two processes shown in FIG. 2A and FIG. 2B. In FIG. 2A and FIG. 2B, the lateral direction is a circumference direction (sector direction) and the vertical direction is a radial direction (cylinder direction).

In one of the processes, as shown in FIG. 2A, a partly written servo pattern 17a is used for read, this serves as a basis of the positioning (radial direction positioning) of a write head, and on an outer side in the radial direction of a second servo pattern 17b, an additional second servo pattern 17b is written. Subsequently, as shown in FIG. 2B, the second servo pattern 17b is in turn used for read, this serves as a basis of the positioning of a write head, and on an outer side in the radial direction of the aforesaid servo pattern 17a, an additional servo pattern 17a is written. Thereafter, the processes shown in FIG. 2A and FIG. 2B are repeated, so that the servo patterns are written on the entire surface of the magnetic disc 12.

Figure 3:
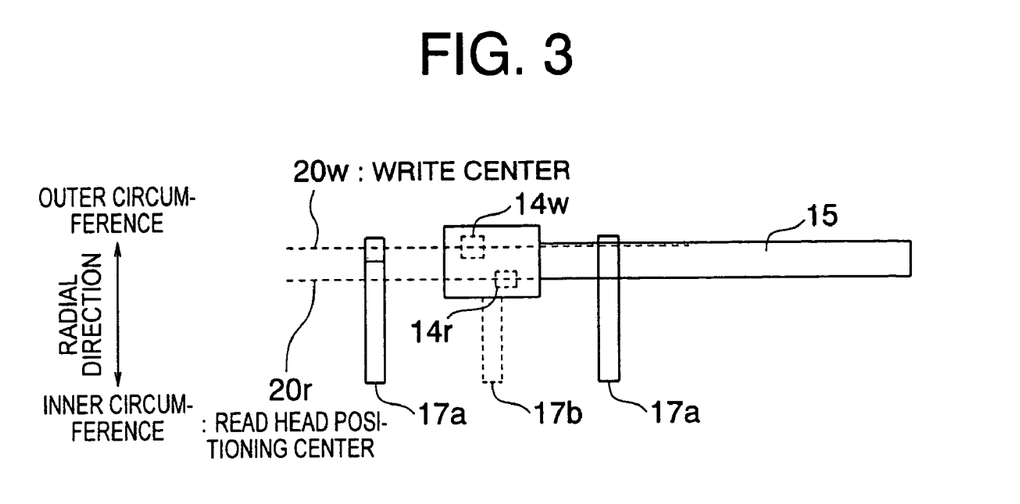
FIG. 3 is an explanatory view of the self-servowrite, in which the relation with a head is added.

FIG. 3 is an explanatory view of the self-servowrite, in which the relation with the head 14 is added. The head 14 provided at the tip of the carriage 15 has a read head 14r and a write head 14w. The write head 14w is used for the write for the servo write itself. A signal read by the read head 14r (a signal based on the servo pattern 14a or 14b) serves as a basis of the positioning of the write head 14w. In other words, it is one of the characteristics of the self-servowrite that the read head 14r is positioned at a predetermined read head positioning center 20r, using an output signal of the read head 14r, in order to position the write head 14w at a predetermined write center 20w.

As shown in FIG. 3, for example, when the servo pattern 17a is additionally written, the read head 14r is positioned at the read head positioning center 20r so that the write head 14w is positioned at the write center position 20w, in consideration of a radial direction interval between the read head 14r and the write head 14w. This positioning of the read head 14r is enabled by reading and using the already written servo pattern 17b. Note that areas of the magnetic disc 12 on which the servo patterns 17a, 17b are already written are called servo information written areas for convenience sake. In the self-servowrite, it is important to know the actual positional relation in the radial direction between the read head 14r and the write head 14w in all the areas of the magnetic disc 12.

Note that the radial direction width of the write head 14w is large enough to write servo information corresponding to a track width. On the other hand, the radial direction width of the read head 14r is generally set narrower than that of the write head 14w. This is intended for making it difficult to pick up a signal of an adjacent track.

Figure 4:
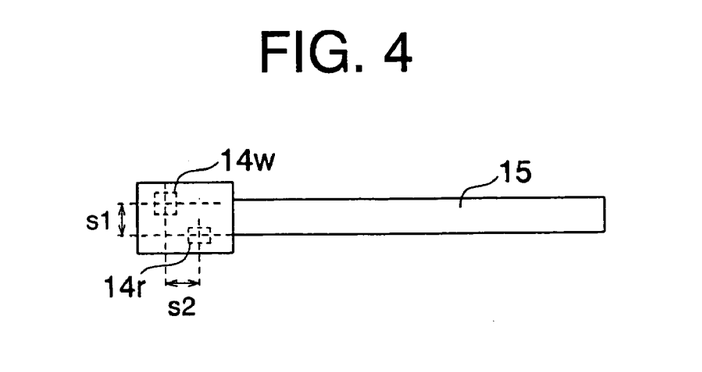
FIG. 4 is a schematic view showing the structure of the head.

FIG. 4 is a schematic view showing the structure of the head 14. As shown in the drawing, the read head 14r and the write head 14w are apart from each other by, for example, s1 in the nominal radial direction, and are apart from each other by, for example, s2 in the nominal circumference direction. Various deviation manners in the radial direction and the circumferential direction may be possible, but s2 is set mainly from manufacturing reasons and s1 is set so that the write head 14w is disposed on an outer circumference side, thereby facilitating the write of a new servo pattern.

Figure 5A:
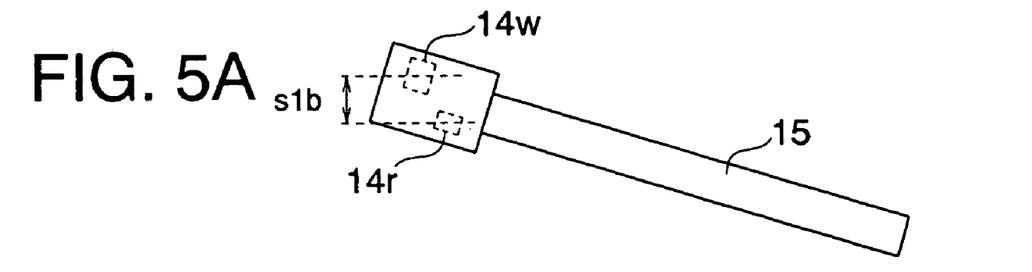
FIG. 5A, FIG. 5B, and FIG. 5C are schematic views showing how a radial direction interval between a read head and a write head changes depending on the position of a carriage.
Figure 5B:
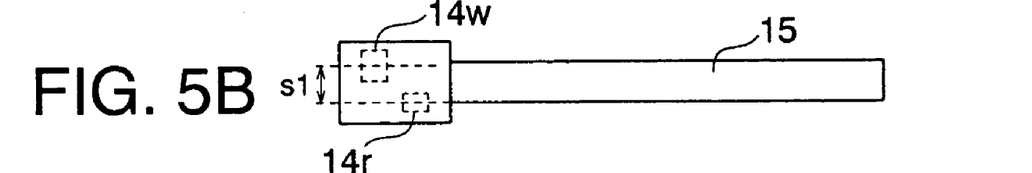
Figure 5C:
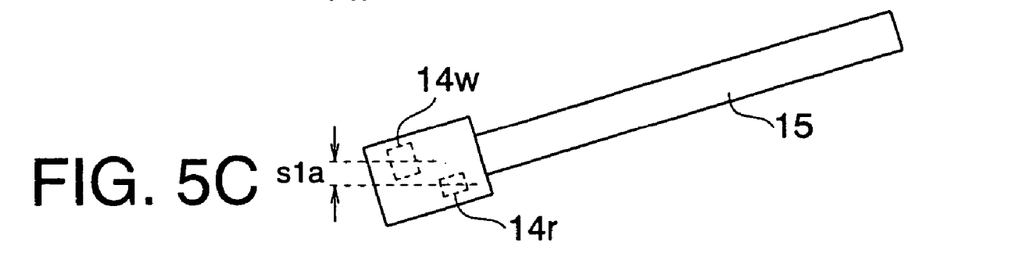

FIG. 5A, FIG. 5B, and FIG. 5C are schematic views showing how the radial direction interval between the read head 14r and the write head 14w changes depending on the position of the carriage 15. In other words, they are views showing an actual positional relation in the radial direction between the read head 14r and the write head 14w. FIG. 5A shows a state on an outer circumference side of the magnetic disc 12, FIG. 5B is a state on a middle circumference of the magnetic disc 12, and FIG. 5C shows a state on an inner circumference side of the magnetic disc 12. As shown in these drawings, the actual radial direction interval between the read head 14r and the write head 14w changes from s1a to s1b. This is because the head 14 provided at the tip of the carriage 15 draws an arc when moved by the voice coil motor 16 as shown in FIG. 1. Each of the radial direction intervals can be also determined by, for example, a radial direction position of the carriage 15.

Figure 6:
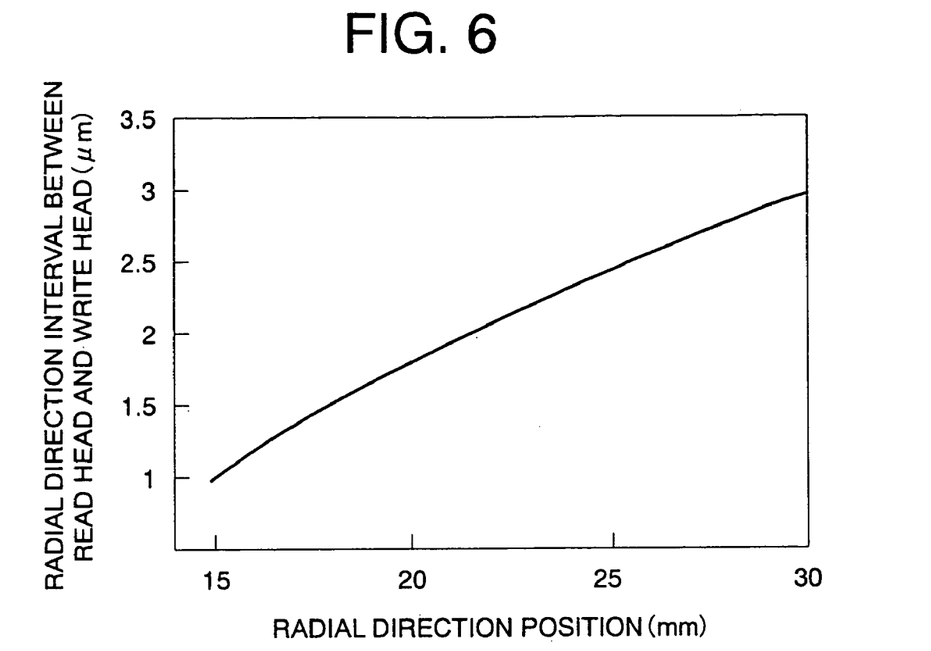
FIG. 6 is a graph showing an example when the radial direction interval between the read head and the write head is measured with the position of the carriage being varied.

FIG. 6 is a graph showing an example when the radial direction interval between the read head 14r and the write head 14w is measured with the position of the carriage 15 being varied. In this example, the actual radial direction interval between the read head 14r and the write head 14w changes from 1 μm to 3 μm. This measurement result is obtained in such a manner that the carriage 15 is moved to a given point, a signal written by the write head 14w at this point is read by the read head 14r, and the positional change of the carriage 15 at this time is converted to the radial direction interval.

Figure 7:
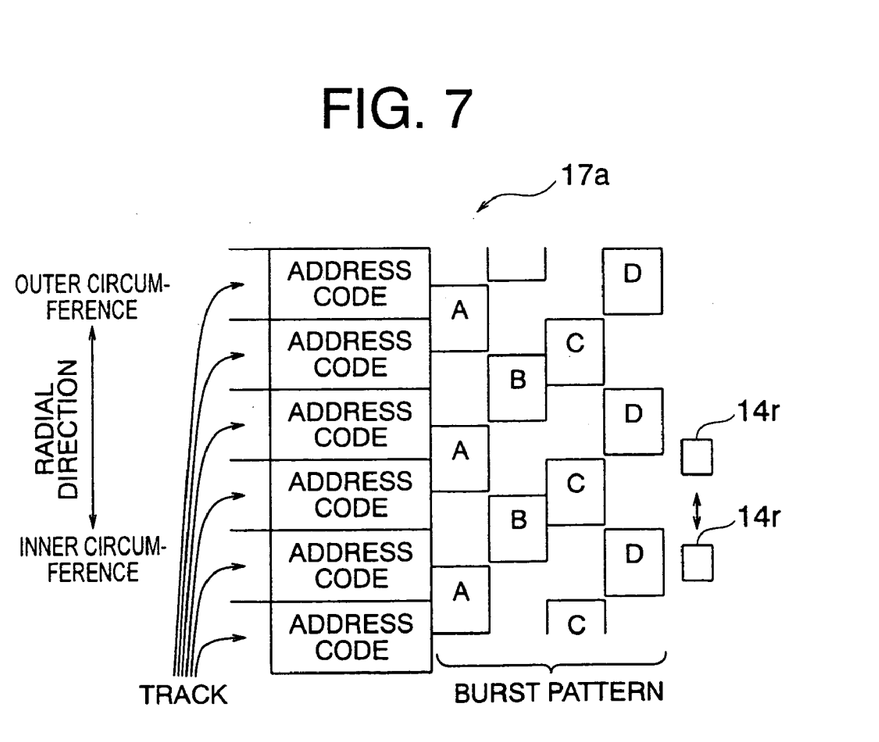
FIG. 7 is a view showing a servo pattern in detail.

FIG. 7 is a view showing the servo pattern 17a in detail. As shown in the drawing, the servo pattern 17a consists of four kinds of burst patterns A, B, C, D whose positions are different in the circumferential direction and the other portions (portions on which address codes or the like are recorded). Each of the portions on which the address codes or the like are recorded corresponds to each track and is recorded in the circumferential direction.

Among the four kinds of burst patterns A, B, C, D, the patterns A and the patterns B are recorded at positions complementary to each other in the radial direction, being positioned so that phases thereof are opposite to phases of the tracks in the radial direction. The patterns C and the patterns D are recorded at positions complementary to each other in the radial direction, being positioned so that phases thereof are the same as phases of the tracks. The radial direction width of each of the burst patterns A, B, C, D is the same as the track width and signals with a certain frequency are recorded thereon only at predeteremined positions in the circumferential direction (i.e., in bursts). Note that hereinafter the servo pattern 17a (17b) sometimes means only the burst patterns.

As shown in FIG. 7, it is theoretically possible to position the read head 14r at a middle point between the burst patterns A and B based on read signals thereof. In this case, the read head 14r is positioned substantially on the track. Further, it can be positioned at a middle point between the burst patterns C and D based on read signals thereof. In this case, it is positioned at a position across adjacent tracks.

Figure 8A:
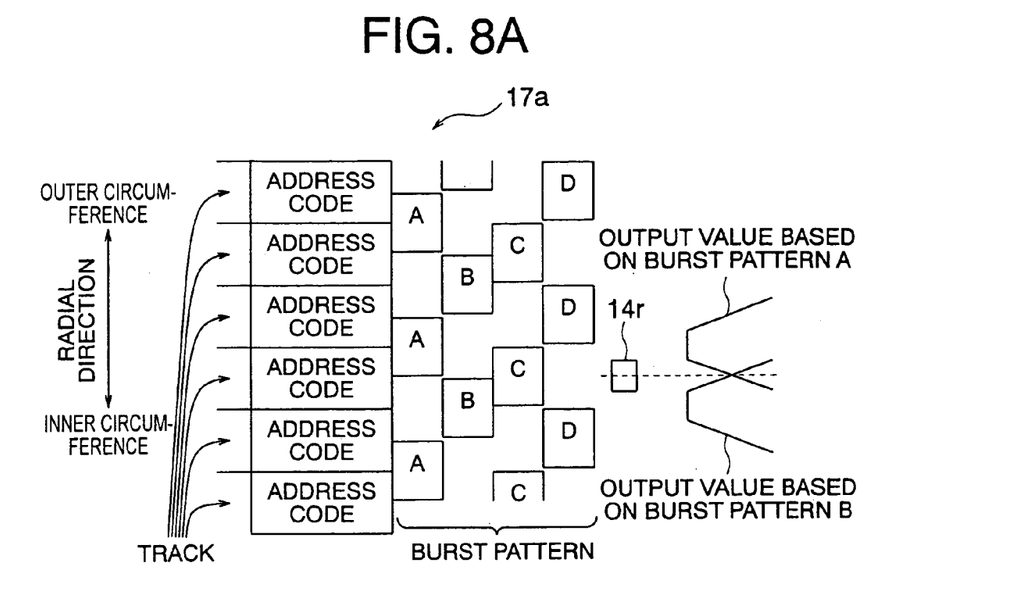
FIG. 8A and FIG. 8B are schematic views to explain the positioning of the read head based on read of the servo pattern.
Figure 8B:
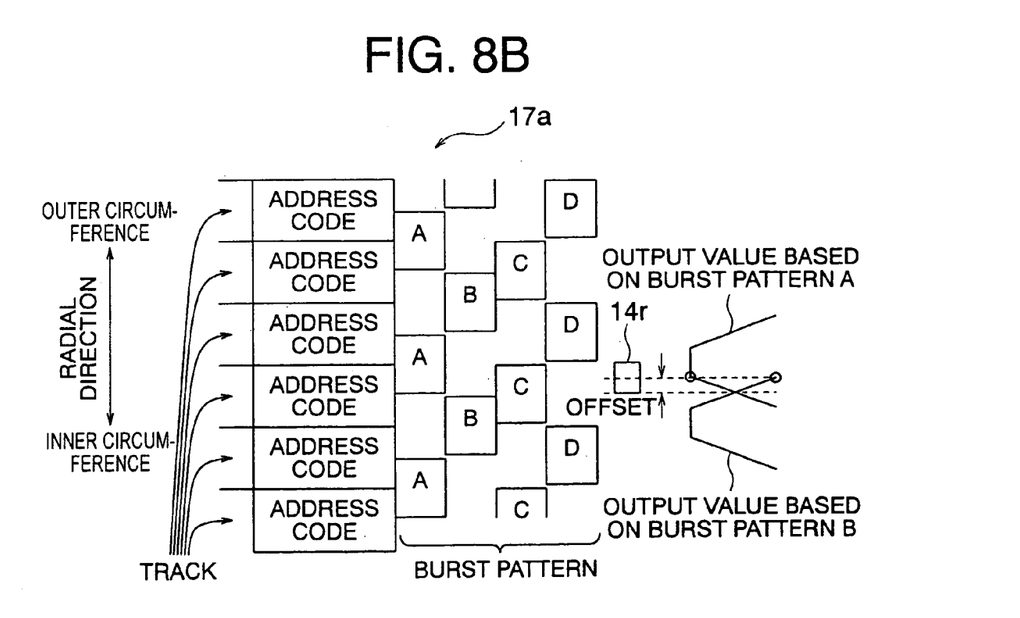

FIG. 8A and FIG. 8B are schematic views to explain the positioning of the read head 14r based on the read of the servo patterns. When the read head 14r is positioned as shown in FIG. 8A, read output values as shown in the drawing are obtained based on the burst patterns A and B respectively. Specifically, when the read head 14r is shifted to an upper side in the drawing, the output of the read head 14r based on the burst pattern A increases and the output thereof based on the burst pattern B decreases. Conversely, when the read head 14r is shifted to a lower side in the drawing, the output of the read head 14r based on the burst pattern A decreases and the output thereof based on the burst pattern B increases. Consideration of the respective areas of the burst patterns A, B read by the read head 14r would make these results obvious. Accordingly, controlling the carriage 15 (in other words, the voice coil motor 16) so that the output values on the servo patterns A and B have a predeteremined difference makes it possible to position the read head 14r at a desired offset position.

Here, assuming that the read head 14r is shifted upward to an offset position as shown in FIG. 8B (assuming that it is deviated by an amount corresponding to one fourth of the track width or of the radial direction width of the servo pattern), the output values of the read head 14r based on the burst patterns A, B become saturated or zero, so that information corresponding to the position of the read head 14r cannot be obtained. Therefore, positioning precision of the read head 14r is deteriorated in this state. This applies to the case where the read head 14r is shifted downward to an offset position by the same amount. The above description applies to the positioning of the read head 14r based on the burst patterns C, D. This result shows that it is not preferable to use the read head 14r in the positioning of the read head 14r until the offset amount of the read head 14r reaches an amount corresponding to one fourth of the track width or of the radial direction width of the servo pattern.

Figure 9:
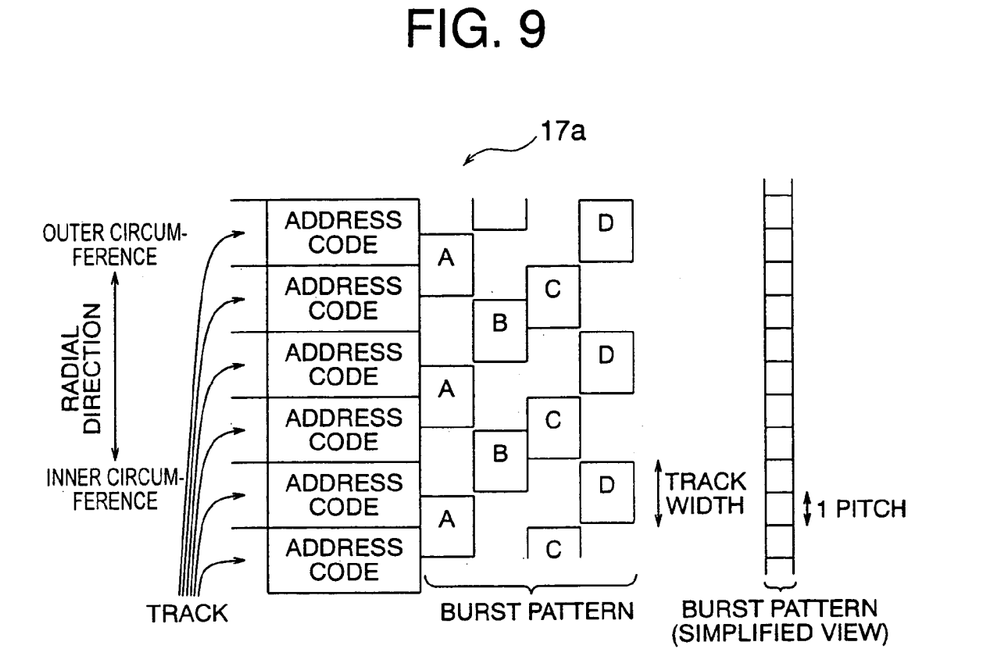
FIG. 9 is an explanatory view showing a simplified view of burst patterns.

FIG. 9 is an explanatory view showing a simplified view of the burst patterns A, B, C, D. In this simplified view, one pitch corresponds to half the track width (=the radial direction width of each of the burst patterns A, B, C, D), and the boundaries of the pitches match the relation of the burst patterns A, B, C, D. Hereinafter, the simplified view as in the drawing will be used to show the servo pattern 17a (or 17b).

Figure 10A:
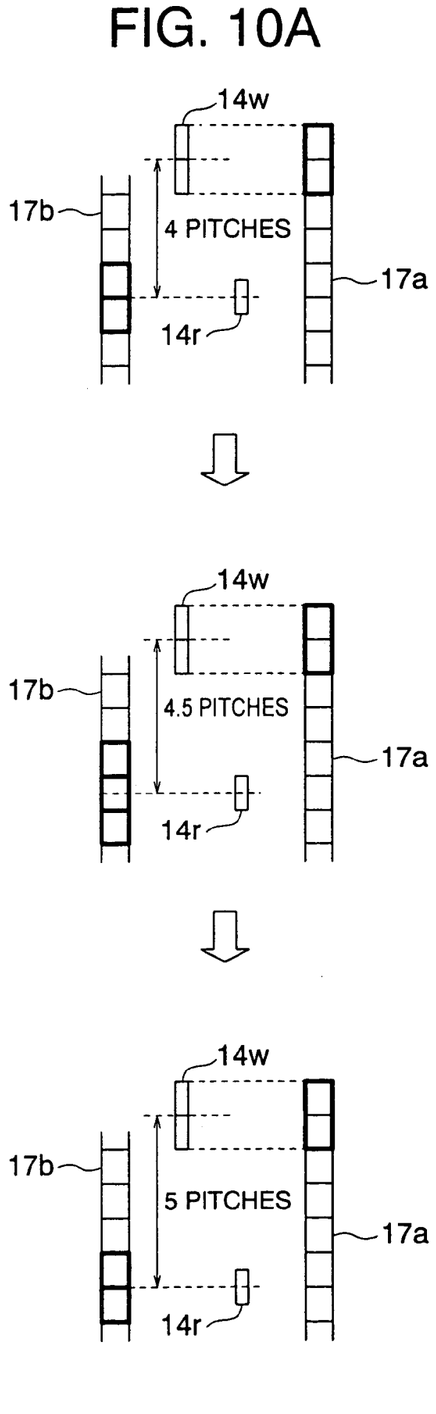
FIG. 10A and FIG. 10B are explanatory views each showing the relation between the positioning of the read head and the position of the servo pattern (burst pattern) additionally written by the write head.
Figure 10B:
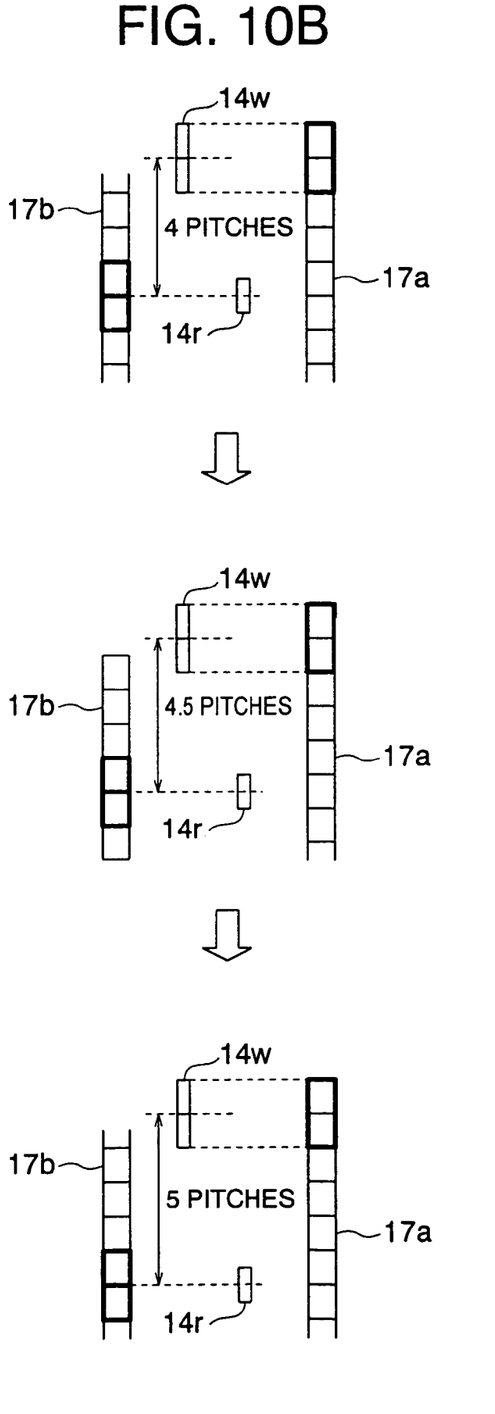

FIG. 10A and FIG. 10B are explanatory views showing the relation between the positioning of the read head 14r and the position of the servo pattern (burst pattern) additionally written by the write head 14w. These drawings show cases where the actual radial direction interval between the read head 14r and the write head 14w becomes wider in the order of the upper, middle, and lower views, and specifically, the interval becomes wider from, for example, 4 pitches to 5 pitches here. FIG. 10A is a comparative example where the servo pattern 17a and the second servo pattern 17b are constantly kept in the same arrangement relation.

In this case, the read head 14r is first positioned at the pitch boundary in the second servo pattern 17b as shown in the upper view, and based on this, the write head 14w is positioned to additionally write the servo pattern 17a. At this time, the offset amount of the read head 14r is zero. As such additional write of the servo pattern 17a based on the servo pattern 17b, or conversely, of the servo pattern 17b based on the servo pattern 17a progresses toward an outer circumference, the actual interval between the read head 14r and the write head 14w becomes wider. In accordance with such increase, the offset amount of the position of the read head 14r is increased. This enables the additional write of the servo patterns 17a, 17b with the track width being kept constant.

However, when the actual interval between the read head 14r and the write head 14w increases to 4.5 pitches as shown in the middle view, the offset amount to be added to the position of the read head 14r becomes 0.5 pitch. The read head 14r at this time is in a positioned state as shown in FIG. 8B, which deteriorates accuracy of positioning precision as described above. Therefore, the servo pattern 17a (or 17b) additionally written at this time is greatly misaligned.

Thereafter, when the actual interval between the read head 14r and the write head 14w is widened to 5 pitches as shown in the lower view, the offset amount to be added to the position of the read head 14r reduces to zero again. The read head 14r at this time is in a positioned state as shown in FIG. 8A, which ensures positioning precision thereof. Therefore, the servo pattern 17a (or 17b) to be additionally written at this time is recorded at a highly accurate position in terms of the relation with the other servo pattern 17b (or 17a) which was a basis of the read.

In the case shown in FIG. 10B compared with the above-described case, the write arrangement relation between the servo pattern 17a and the second servo pattern 17b is not constantly the same, which is an example corresponding to this embodiment of the present invention. In this case, the states in the upper view and the lower view are the same as those in the above-described case, and in the middle view, the second servo pattern 17b is written at a position deviated by 0.5 pitch (one fourth of the radial direction-width of the burst pattern) in the radial direction.

To explain step by step, the read head 14r is first positioned at the pitch boundary in the second servo pattern 17b as shown in the upper view, and the write head 14w is positioned based on this to additionally write the servo pattern 17a. The offset amount of the read head 14r at this time is zero. As such additional write of the servo pattern 17a based on the second servo pattern 17b, or conversely, of the servo pattern 17b based on the servo pattern 17a progresses toward an outer circumference, the actual interval between the read head 14r and the write head 14w gradually increases. The offset amount of the position of the read head 14r is increased in accordance with such increase.

Next, when the actual interval between the read head 14r and the write head 14w reaches 4.25 pitches (that is, when the added offset amount reaches 0.25 pitch (=one eighth of the radial direction width of each of the burst patterns A, B, C, D or of the track width)), the offset amount of the position of the read head 14r is changed to opposite polarity this time. Consequently, when the servo pattern 17b is written based on the servo pattern 17a, the boundary of the write position of the servo pattern 17b deviates from the boundary of the previous write position by a half pitch.

Based on the second servo pattern 17b thus written, the servo pattern 17a is written and the second servo pattern 17b is further written based on this servo pattern 17a. Then, when the actual interval between the read head 14r and the write head 14w is gradually increased to 4.5 pitches, the state as shown in the middle view is obtained. At this time, the offset amount of the read head 14r is reduced to zero as reverse polarity. Therefore, no such problem as in the case shown in FIG. 10A occurs and write position accuracy of the servo pattern 17a(or 17b) additionally written is constantly ensured up to this operation.

Thereafter, similar additional write is repeated, and when the actual interval between the read head 14r and the write head 14w increases to 4.75 pitches, the offset amount of the read head 14r is changed to the opposite polarity again. Then, when the actual interval further increases to 5 pitches as shown in the lower view, the offset amount to be added to the position of the read head 14r becomes zero again. Thereafter, the similar offset is added to the position of the read head 14r in accordance with further increase in the actual interval between the read head 14r and the write head 14w.

In this embodiment, the offset amount to be added at the time of the positioning of the read head 14r is 0.25 pitch at the maximum (in relative terms, −0.25 pitch to 0.25 pitch) and positioning precision can be constantly ensured. Accordingly, the write position of the servo pattern 17a or 17b written by the write head 14w is accurate in relation with the other servo pattern, and all the servo patterns 17a, 17b can be written at accurate positions owing to the accurate positions of the servo patterns 17a, 17b serving as bases of the additional write.

Figure 11:
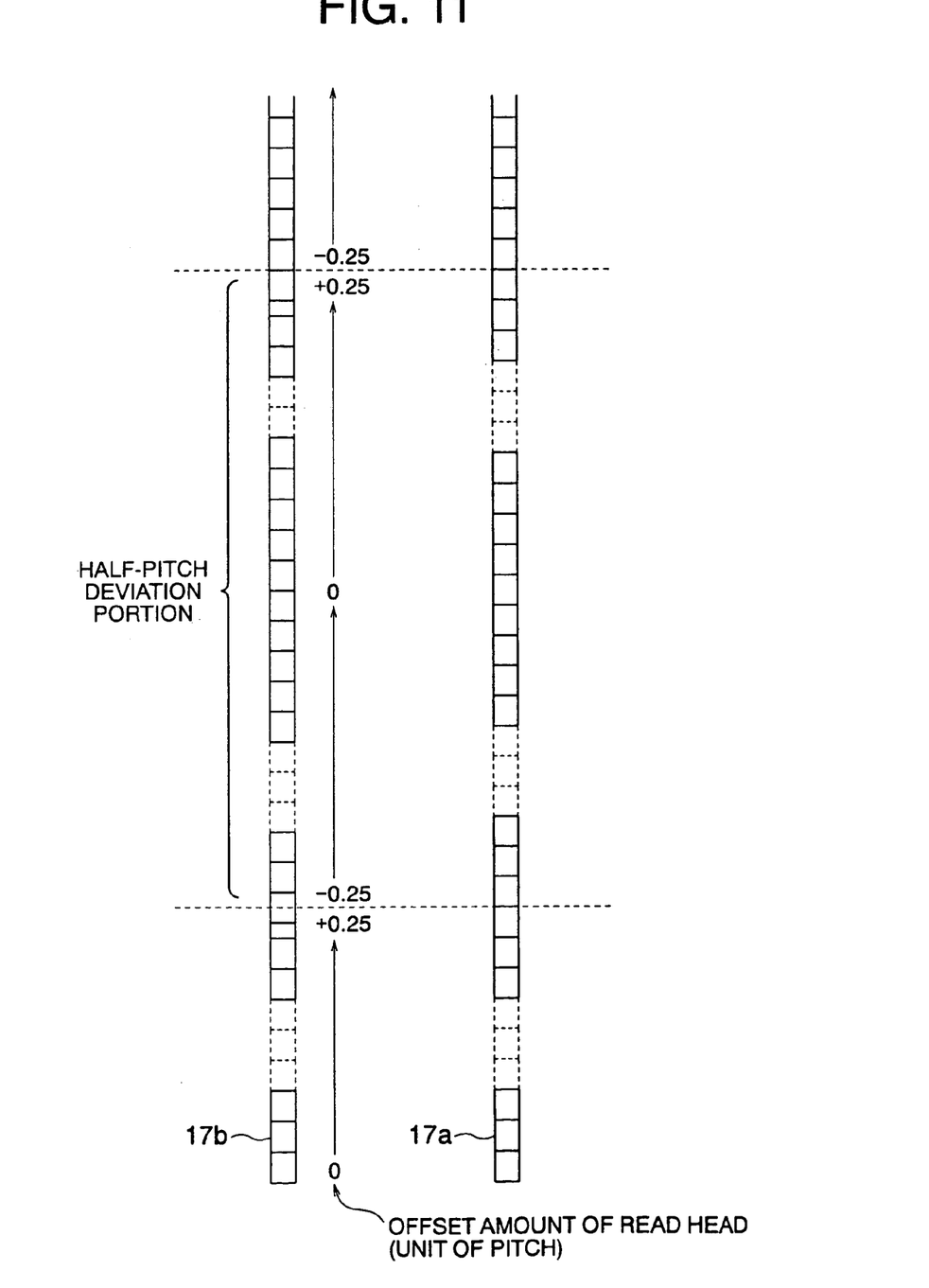
FIG. 11 is a schematic view showing the positional relation between a first (one type) servo pattern and a second (the other type) servo pattern.

The servo patterns 17a, 17b as shown in FIG. 11 are obtained after the servo patterns 17a, 17b are written as in the above-described embodiment. FIG. 11 is a schematic view showing the positional relation between a first (one type) servo pattern 17a and a second (the other type) servo pattern 17b. In the second servo patterns 17b, a half-pitch deviation portion (first repetition pattern portion) and a no-deviation portion (second repetition pattern portion) are alternately arranged.

Figure 12:
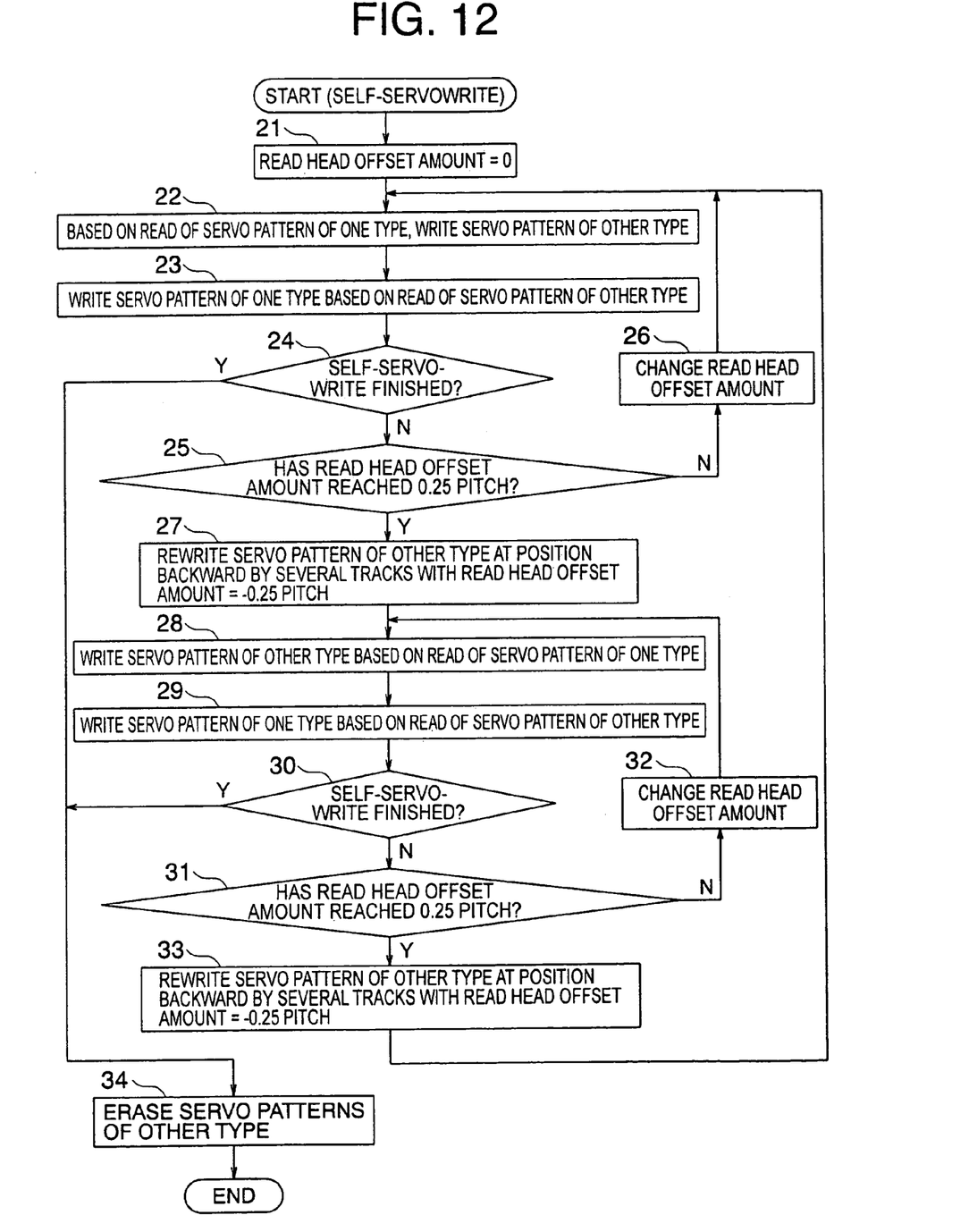
FIG. 12 is a flowchart showing the flow of a servo pattern write method according to an embodiment of the present invention.

The substantial contents of the servo pattern write method as an embodiment of the present invention has been also disclosed in the description hitherto, but the servo pattern write method according to the embodiment will be further described with reference to FIG. 12. FIG. 12 is a flowchart showing the flow of the servo pattern write method according to the embodiment of the present invention.

First, the offset amount of the position of the read head 14r is set to zero (Step 21). Then, based on the read of a servo pattern 17a of one type, a servo pattern 17b of the other type is written (Step 22). More specifically, the read head 14r reads the servo pattern 17a of one type and is positioned so that the offset amount becomes zero, and the servo pattern 17b of the other type is written (additionally written) by the write head 14w that is positioned based on the positioning of the read head 14r. This rephrasing also applies to the following description.

Next, conversely, a servo pattern 17a of one type is written (additionally written) based on the read of the servo pattern 17b of the other type (Step 23). Note that at the first stage, the servo pattern 17a only a small part of which is written on an inner circumference side of the magnetic disc 12 can be initially used. A separate write device may be used only for this initial write. Alternatively, the magnetic disc 11 may be provided with a function of an initial write capability. Steps 22, 23 are generally performed a plurality of times with the position of the read head 14r being changed every one pitch.

Next, unless the self-servowrite is finished (N at Step 24), it is judged whether or not the offset amount of the position of the read head 14r has reached 0.25 pitch (Step 25). If not, the offset amount of the position of the read head 14r is changed (increased) and the flow returns to Step 22. The offset amount is generally changed at this time so that the track width made by the servo write becomes constant. The way of adding the changed offset amount will be described later.

When the offset amount of the position of the read head 14r has reached 0.25 pitch, the offset amount is next changed to the opposite polarity, namely, to −0.25 pitch and the servo pattern of the other type is rewritten at a position shifted backward by an amount corresponding to several tracks. (Step 27). This rewrite, though not described above, is intended for quick readiness for new write in consideration of the arrangement relation between the read head 14r and the write head 14w.

Next, Steps 28, 29, 30, 31, 32, 33 similar to Steps 22, 23, 24, 25, 26, 27 described above are executed. These two series of the steps are the same except that the offset amount of the position of the read head 14r is changed to the opposite polarity. After Step 33, the procedure starting from Step 22 follows again. Then, when the self-servowrite is completely finished during the execution of these steps, the flow shifts from Step 24 or Step 30 to Step 34 of "erase the servo patterns 17b of the other type". This erasure is intended for erasing the second servo patterns 17b which are not necessary as a product. However, if the erasure takes a lot of time and labor, they may be left unerased. Further, the written servo patterns 17a being considered as still under the manufacturing process, servo patterns for a product can be newly written based on these servo patterns 17a.

Figure 13:
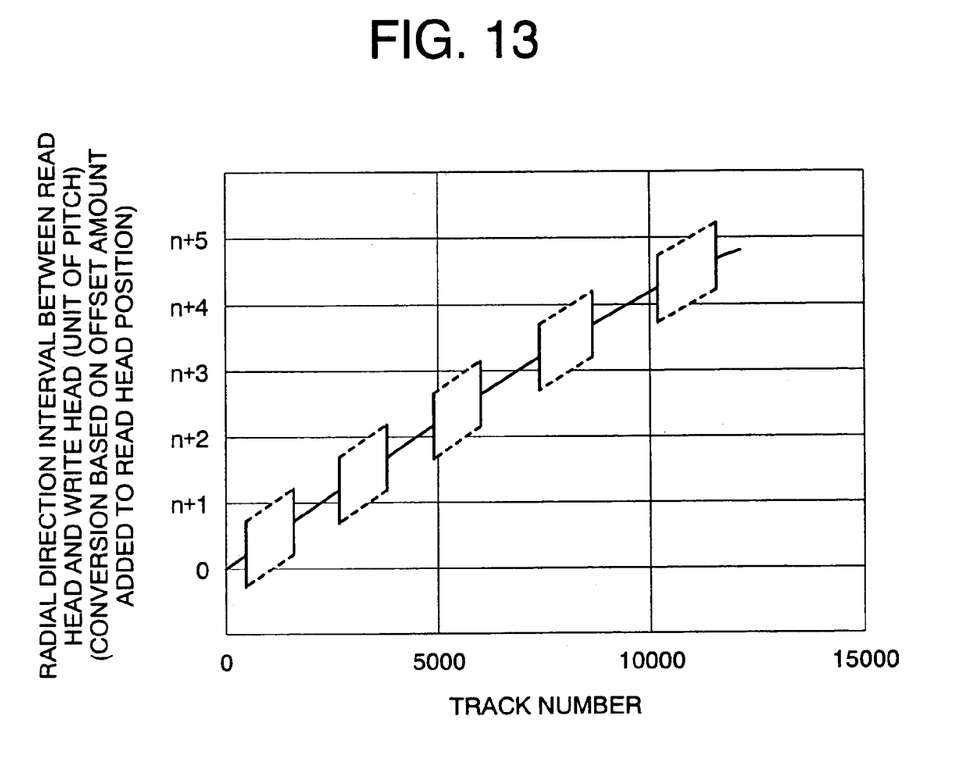
FIG. 13 is a graph showing an example when the radial direction interval between the read head and the write head is calculated with the position of the carriage being varied, the radial direction interval being converted to a corresponding value in a unit of pitch based on an offset amount added to the position of the read head.

FIG. 13 is a graph showing an example when the radial direction interval between the read head 14r and the write head 14w is calculated with the position of the carriage 15 being varied, the radial direction interval being converted to a corresponding value in a unit of pitch based on the offset amount added to the position of the read head 14r. The horizontal axis takes the track number (corresponding to the radial direction of the magnetic disc 12). The solid lines in the graph show values during the additional write of the servo patterns 17a and the servo pattern 17b with no pitch deviation in arrangement, and the broken lines show values during the additional write of the servo patterns 17a and the servo patterns 17b with a half-pitch deviation in arrangement (the half-pitch deviation portion in FIG. 11). The two upper and lower broken lines are shown here because either value can be taken. This drawing clearly shows that the value on the vertical axis of the graph constantly falls within an integer ±0.25 pitch.

Incidentally, the half-pitch deviation portion (refer to FIG. 11) occurs five times in the case shown in FIG. 13, and this number of the occurrence times becomes larger because of certain reasons, a narrower pitch of tracks recorded on the magnetic disc 12 being one of the reasons. In consideration of the recent trend toward a smaller magnetic disc and higher density recording, the number of the occurrence times can be, for example, a several times to ten and several times.

The supplementary description will be given regarding Steps 26, 32 of changing the read head offset amount in FIG. 12. The offset amount can be also changed based on an output resulting from the read of the burst patterns A, B, C, D by the read head 14r, besides based on the position of the carriage 15. In this case, for example, the read head 14r is first given an offset so that outputs based on the burst pattern A and the burst pattern D have the same value. If the track interval is relatively wide at this time, "an absolute value of A–B" and "an absolute value of C–D" become relatively smaller in the read outputs on average. Therefore, by calculating these values, variation in the track width can be found. The read head offset amount is controlled (gradually increased) in advance so as to eliminate such variation (in practice, when such a sign starts to appear).

In the description above, the additional write as the self-servowrite operation starts from the inner circumference side of the magnetic disc 12 and shifts to the outer circumference side thereof, but the additional write from the outer circumference side to the inner circumference side is of course made possible based on the same principle.

The present invention is not limited to the specific embodiments described here with reference to the drawings, but it is understood that all changes which come within the range of the following claims are intended to be embraced therein.

What is claimed is:

1. A disc apparatus comprising:
    a disc as a recording medium;
    a recording element which records information on the disc; and
    a read element which reads the information recorded on the disc,
    wherein the disc includes:
    a first servo pattern formed of burst patterns and written so as to have predetermined repetition patterns in a radial direction; and
    a second servo pattern having a first repetition pattern portion and a second repetition pattern portion that are alternately arranged in the radial direction, the first repetition pattern portion having same repetition patterns as the repetition patterns of the first servo pattern and written at a position deviated in the radial direction from the first servo pattern by approximately one fourth of a width in the radial direction of the burst pattern, and the second repetition pattern portion having same repetition patterns as the repetition patterns of the first servo pattern and written at a position with substantially no deviation in the radial direction from the first servo pattern.

2. The disc apparatus as set forth in claim 1, wherein a width of each track defined by the burst pattern is substantially constant, not dependent on a radial direction position thereof on the disc.

3. The disc apparatus as set forth in claim 1, wherein the burst patterns are four kinds of burst patterns whose positions in a circumferential direction are different.

4. A servo pattern write method comprising:
    a first step of additionally writing, on an outer side/inner side in a radial direction of a second servo pattern that has been written on a disc, a second servo pattern with a first offset being added to a position of a read head so as to keep a track width constant based on read of a first servo pattern that has been written on the disc, and additionally writing a first servo pattern on an outer side/inner side in the radial direction of the first servo pattern that has been written on the disc, with a second offset being added to the position of the read head so as to keep the track width constant based on read of the additionally written second servo pattern, the additional write of the second servo pattern and the additional write of the first servo pattern being alternately executed;
    a second step of detecting that the first offset added at the read of the first servo pattern has reached approximately one eighth of the track width;
    a third step, after the detection, of additionally writing a second servo pattern on an outer side/inner side in the radial direction of the additionally written second servo pattern with a third offset in an opposite direction of the first offset being added to the position of the read head so as to keep the track width constant based on read of the additionally written first servo pattern, and additionally writing a first servo pattern on an outer side/inner side in the radial direction of the additionally written first servo pattern with a fourth offset in an opposite direction of the second offset being added to the position of the read head so as to keep the track width constant based on read of the additionally written second servo pattern, the additional write of the second servo pattern and the additional write of the first servo pattern being alternately executed; and
    a fourth step of detecting that the third offset added at the read of the first servo pattern has reached approximately one eighth of the track width,
    wherein the first, second, third, and fourth steps are repeated a plurality of times.

5. The servo pattern write method as set forth in claim 4, further comprising:
    erasing the second servo patterns after the additional write of all the second servo patterns is completed.

6. The servo pattern write method as set forth in claim 4, wherein at a start of the third step after the second step and at a start of the first step after the fourth step, the second servo pattern is additionally written at a position slightly deviated backward from a final write position of the second servo pattern.

* * * * *